United States Patent
Neubauer et al.

(10) Patent No.: US 9,289,708 B2
(45) Date of Patent: Mar. 22, 2016

(54) TUBE SEPARATOR AS A SEPARATOR OF VERY FINE PARTICLES FOR REDUCING FINE DUST EMISSIONS AND AVOIDING STACK RAIN

(75) Inventors: Georg Neubauer, Seeburg (DE); Detlef Weber, Essen (DE)

(73) Assignee: REA PLASTIK TECH GMBH, Neuruppin (DE)

( * ) Notice: Subject to any disclaimer, the term of this patent is extended or adjusted under 35 U.S.C. 154(b) by 264 days.

(21) Appl. No.: 13/994,132

(22) PCT Filed: Nov. 28, 2011

(86) PCT No.: PCT/EP2011/071185
§ 371 (c)(1),
(2), (4) Date: Jun. 14, 2013

(87) PCT Pub. No.: WO2012/079966
PCT Pub. Date: Jun. 21, 2012

(65) Prior Publication Data
US 2013/0263742 A1 Oct. 10, 2013

(30) Foreign Application Priority Data
Dec. 17, 2010 (DE) .................... 20 2010 016 752 U (51) Int. Cl.
| | | |
|---|---|---|
| B01D 41/00 | (2006.01) | |
| B01D 45/08 | (2006.01) | |
| B01D 46/00 | (2006.01) | |
| B01D 50/00 | (2006.01) | |
| B01D 45/12 | (2006.01) | |
| B01D 45/06 | (2006.01) | |
| B01D 53/78 | (2006.01) | |
| F01M 13/04 | (2006.01) | |
| B01D 53/50 | (2006.01) | |

(52) U.S. Cl.
CPC .............. *B01D 45/08* (2013.01); *B01D 45/06* (2013.01); *B01D 45/12* (2013.01); *B01D 46/0068* (2013.01); *B01D 50/002* (2013.01); *B01D 53/78* (2013.01); *B01D 53/504* (2013.01); *B01D 2251/404* (2013.01); *B01D 2257/302* (2013.01); *F01M 13/04* (2013.01)

(58) Field of Classification Search
CPC .. B01D 45/08; B01D 46/0068; B01D 50/002; B01D 45/12; B01D 53/78; B01D 45/06; B01D 2257/302; B01D 53/504; B01D 2251/404; F01M 13/04
USPC ................... 55/462, 465, 422, 283, 302, 294; 96/232, 356–360
See application file for complete search history.

(56) References Cited

U.S. PATENT DOCUMENTS

| | | | | |
|---|---|---|---|---|
| 4,157,250 | A * | 6/1979 | Regehr et al. | .................... 96/299 |
| 6,051,041 | A | 4/2000 | Wurz et al. | |
| 2009/0188393 | A1 | 7/2009 | Sato et al. | |
| 2010/0206169 | A1* | 8/2010 | Kanka et al. | .................... 96/181 |

FOREIGN PATENT DOCUMENTS

| | | |
|---|---|---|
| DE | 20 2005 002 674 U1 | 4/2005 |
| DE | 20 2009 004 019 U1 | 6/2009 |
| DE | 20 2010 007 266 U1 | 10/2010 |
| JP | 56-137720 U | 10/1981 |
| JP | 8-103625 A | 4/1996 |
| JP | 10-502021 A | 2/1998 |
| JP | 2009-178709 A | 8/2009 |

* cited by examiner

*Primary Examiner* — Dung H Bui
(74) *Attorney, Agent, or Firm* — Norman B. Thot (57) ABSTRACT

A separation system for separating drops from a flue gas flow for installation in a gas scrubber of a power plant or an incineration plant includes a front coarse separator arranged in a gas flow direction, and a rear final separator arranged in the gas flow direction. The rear final separator is provided to have a lower separation performance in comparison with an upstream separator in the gas flow direction and/or is provided as a tube separator.

13 Claims, 3 Drawing Sheets

TUBE SEPARATOR AS A SEPARATOR OF VERY FINE PARTICLES FOR REDUCING FINE DUST EMISSIONS AND AVOIDING STACK RAIN

CROSS REFERENCE TO PRIOR APPLICATIONS

This application is a U.S. National Phase application under 35 U.S.C. §371 of International Application No. PCT/EP2011/071185, filed on Nov. 28, 2011 and which claims benefit to German Patent Application No. 20 2010 016 752.3, filed on Dec. 17, 2010. The International Application was published in German on Jun. 21, 2012 as WO 2012/079966 A1 under PCT Article 21(2).

FIELD

The present invention relates to a drop separator system for use in flue gas desulfurization of power plants. On the one hand, this separator concept is intended to take into account the requirements of the emissions regulations in Europe and the USA and to provide the separation performance required therein. On the other hand, this concept is intended to overcome the known problem of stack rain (severe ejection of drops from a wet stack). This separator concept is also intended to minimize contamination of the components after the drop separator (in the flue gas flow direction).

BACKGROUND

Flue gases from fossil-fuelled thermal power plants are predominantly desulfurized using the wet scrubbing method. The sulfur-containing flue gas is sprayed with limestone milk (suspension solution) and the $SO_2$ in the flue gas is bonded in the spray drops of this suspension solution and then converted to calcium sulfite dihydrate (gypsum). The smaller of these spray drops are carried along with the gas flow.

The task of the drop separator system is to trap these drops which are carried along in the gas flow and feed them back into the scrubber circuit. A buildup of deposits in the downstream components (heat exchanger, flue gas channels, wet fan, stack etc.) and consequently corrosion and increased pressure losses otherwise occur. This results in reduced performance of the power plant (increased pressure losses cause increased inherent electricity consumption and possibly also a reduction in generation) and maintenance costs (refurbishment of corrosion points and cleaning costs for removing the built-up deposits).

New emissions regulations applicable or planned in Europe and the USA also provide for a considerable reduction in the solid material content in the flue gas (reduction of fine dust). These new limits make a massive improvement of the separation in flue gas desulfurization compulsory. In the meantime, some European countries and regions are demanding that the fine dust and solid material content be reduced to 3-6 $mg/Nm^3$.

Many power plants in the USA and lately, also in Europe, are equipped with a so-called wet stack. The saturated flue gas is fed into the stack without reheating; as a result of the cooling on the way through the stack, liquid condenses and leads to a "wet" stack. The problem with many of these wet stacks is that large quantities of drops are ejected from the stack. The drops rain down in the immediate vicinity of the stack, and sometimes also at greater distances. The grounds of the power plant are thereby contaminated, other facilities and buildings nearby are soiled, and people and animals are also inconvenienced. As these drops tend to be acidic, this stack rain leads to corrosion and damage to the grounds affected, the paint on cars is damaged, soil is acidified, building facades and roofs are damaged by corrosion etc.

Experience with stack rain and the problems with fine dust emissions shows that the two-stage drop separators traditionally used are no longer adequate. The quantity of solid material (fine dusts, salts etc.) in the residual content after the drop separator is higher than the values allowed in these limits. Drop ejection (stack rain) is a considerable problem and a center of conflict with neighbors and conservationists. The buildup of deposits and blockages in the flue gas path give rise to costs and reduce electricity production.

Modern drop separators for flue gas desulfurization are today installed in the scrubber head at the top before the outlet into the flue gas channels. They are exposed to flue gas flowing vertically upwards. This configuration is the best configuration for cost as well as for operating reasons.

The drop separator system separates the drops, such as the dry solid material content, from the gas flow by deflecting the flue gas flow. In doing so, the drops and dry solid material are subjected to centrifugal forces. They are unable to follow the path of the flue gas and impinge on the flow resistances caused by the deflection of the flue gas flow. As a result, the drops are separated on these "baffles" and are thereby removed from the flue gas flow. The separated liquid then flows back down into the scrubber circuit due to gravity.

Drop separators are traditionally configured as packets of chevron/lamella/plate-like and bent deflector bodies. These lamella-like, bent and rigidly suspended deflector bodies are configured so as to form channels through which the flue gas flows. On the one hand, the object of this configuration is to bring about a severe deflection of the flue gas and, on the other, to minimize the "obstruction" of the flue gas path by flow resistances. The baffles or deflector lamellas are generally referred to as lamellas and the separators correspondingly as lamella separators or chevron-type separators. The established lamella separators from various manufacturers differ only due to their geometry, the distances between lamellas and the deflection as well as the design (roof, flat or horizontal incident flow). They are basically the same with regard to operation.

Drop separator systems are designed with at least two stages. Operational experience shows that a single-stage separator system is basically not sufficient to reliably remove the drops from the flue gas. However, even two-stage drop separators (coarse separator and fine separator) still release a considerable quantity of drops with solid materials with the flue gas, often too many for the requirements of the environmental regulations, the operating requirements, and the operation of a wet stack.

Many drop separators have in the meantime therefore built with three stages. In this configuration, the actual separation is carried out by the coarse separator and by the fine separator. The coarse separator removes the majority of drops from the flue gas and achieves separation grades of sometimes significantly more than 90%. On the one hand, the fine separator removes further drops from the flue gas, traps the drops from the washing of the coarse separator, and also traps a large part of the secondary drops which can occur when a drop impinges on the lamella of the coarse separator (reflection drops).

The third or "very fine separator" has three functions.
1. Very fine drops
   The very fine separator filters further very fine drops from the flue gas which can pass through the coarse and fine separators. The amount of liquid and solid materials in these very fine drops is, however, very small. This very fine separation is therefore of lesser importance.

2. Faults

The very fine separator separates drops which pass through from the fine separator as a result of faults. The cause of such faults is either the contamination of the coarse and fine separator, which leads to carry-through, or a considerably non-uniform distribution of the flue gas flow, which leads to local velocity peaks which adversely affect the performance capability of the two first separators. However, this tends rarely to be the case in modern flue gas desulfurization systems; this function therefore also tends to be of lesser importance.

3. Fine separator washing

The very fine separator separates the washing liquid which is extracted from the fine separator when it is washed. It is known from many measurements that the washing of the fine separator leads to a considerable emission of drops. Measurements in the laboratory as well as warranty measurements in power plants have led to the result that 60% to 80% of the amount of liquid after the fine separator is emitted while the fine separator is being washed. The separation of these washing drops is the main function of the very fine separator.

The question of fine dust emissions has attracted considerable attention in recent years, and the regulations for fine dust emissions have been tightened in many countries. The aim is naturally to protect human health.

A second reason for the discussion is the planned regulations for $CO_2$ reduction. Many $CO_2$ separation techniques require a very low very fine dust content in the flue gas. These are methods which separate the $CO_2$ in packaging and packing material and by means of bonding agents. Solid materials from the flue gas contaminate and block the separating systems and are therefore disruptive.

Attention has finally been focused on fine dusts due to the problem of stack rain from wet stacks. The acid rain from chimney stacks leads to contamination and corrosive damage in the immediate surroundings of the stacks and to corresponding conflicts with residents.

Drop separators are naturally at the center of interest because they are responsible for the separation and therefore for the reduction of fine dust emissions. High fine dust emissions, stack rain and problems with $CO_2$ separation are therefore rightly ascribed to "poor" separation of drops in the flue gas desulfurization system.

Stack rain is at the same time the direct focus of attention in many power plants. Stack rain is immediately visible to staff, residents and industrial neighbors of the power plant, and the negative consequences (contamination and corrosion) can quickly be established.

This stack rain consists of large drops with significant solid material content (gypsum and limestone) and is acidic (slight acid content). The drops can immediately be seen on reflective surfaces (on an automobile). The quickly ensuing corrosion etches away the paint on vehicles and leads to damage in gardens, buildings and grounds.

In the USA, stack rain has already been the subject of many court proceedings and legal conflicts between power plant operators on the one hand and residents, conservationists and environmental authorities on the other.

The concentration on stack rain can therefore be explained both by the pure liquid volume and also by the size of the drops. Small drops, which either pass through the drop separator in normal operation (without washing) or small drops which occur in the stack due to condensation, do not attract attention as stack rain because they normally evaporate before reaching the ground. The distance from the tip of the stack to the ground is therefore sufficiently large. The quantity of drops when washing furthermore leads to stack rain being noticed. Individual drops would be ignored and not noticed.

The subject of stack rain is unknown in the older European power plants because reheating has prevented this problem. A seemingly different problem has, however, become relevant time and time again in these power plants, that being the ejection of fine dust. Power plants measure the dust content in the flue gas at the stack. Peaks in the ejected dust, which have led to conflicts with the inspecting authorities, have repeatedly occurred.

This fine dust problem can be explained in a way similar to stack rain in the older American power plants or now the latest European power plants. In older European power plants, reheating provides that all drops evaporate before they reach the tip of the stack. The majority of drops are immediately vaporized in the heat exchanger in that the drops impinge on the surfaces of the heat exchanger and evaporate. Other drops can pass through the heat exchanger, but, on the one hand, they are then greatly diminished and, on the other, they are located in gas which is no longer saturated, enabling further liquid to be absorbed by the hot flue gas and evaporate.

As a consequence of this evaporation, deposits form on the heat exchanger surfaces and must be blown away from this surface. On the one hand, this blowing process is not sufficient to keep the heat exchanger clean; the pressure loss increases and sometimes the power plant even shuts down due to the pressure loss. On the other hand, the blown-off quantities of dust are disposed of through the stack into the atmosphere. The negative effect on the environment is the same as with stack rain.

When analyzing the quantities of fine dust, stack rain has the advantage that the emissions are particularly easy to observe and the causes of the emissions are easier to analyze. Stack rain is moreover a direct problem for many power plants and their residents. Hence the concentration on this effect. Stack rain is, however, also responsible for the other kinds of fine dust emissions.

The known causes of stack rain are poor separation and condensation. Poor separation means that many drops pass through the drop separator and carry liquid over into the stack which is then emitted as stack rain. Further drops are produced by condensation, as the flue gas cools down in the stack and drops of condensation drop out of the saturated flue gas.

Poor separation performance is clearly a possible cause of stack rain. The power plants have further been able to recognize that stack rain is associated with contamination of the drop separator. Contaminated drop separators lead to heavier stack rain. This contamination was produced in turn by a number of design and operational errors. A significant non-uniform distribution of the flue gas flows can likewise lead to local contamination, such as a failure of parts of the washing system. The use of poorly designed separators is likewise known as a cause, as is an incorrect operation of the washing devices etc.

A contaminated separator only works in a very restricted manner. The buildup of deposits and contamination act as a regular "springboard" for drops. The drops which have just been separated are therefore thrown back into the flue gas and disperse further.

This knowledge has led to power plants systematically improving, overhauling and converting the "poor" separators. This has enabled these power plants to significantly reduce the problem.

In spite of the improvement in the separators, stack rain has remained a problem; it has not been fully eliminated.

Condensation of drops from the saturated flue gas has been identified as a second cause of this stack rain. The flue gas cools down on the way through the stack. Even when this cooling-down is less than 1 Kelvin, the effect is still considerable because the flue gas is almost completely saturated. In the course of an hour, and with a large volume of flue gas, even cooling-down by 1 K can produce amounts of condensation of several tons. The cause of the remaining stack rain therefore appeared to be clear and understandable.

This "assumption" must, however, be questioned. Condensation cannot be the cause of the observed stack rain effects. The short journey time in the stack is not sufficient to form large drops. It is true that, with journey times of 10-20 seconds in the stack and temperature differences of less than 1 K, very many very small condensation germs are formed, but not large drops. Stack rain, however, consists of large drops. The drops must be large so that, on the one hand, they reach the ground due to gravity (rain down) and, on the other, do not again evaporate in the ambient air. Both the cold, dry air in winter and the warm ambient air in summer are able to absorb large quantities of liquid. Small drops therefore already evaporate after 5 to 30 m.

In recognition of this fact, it was hypothesized that many drops precipitate on the stack wall and thus accumulate to form large drops. These are then extracted from the liquid film by the flue gas flow and are emitted as large drops. Such effects can in fact be observed, but they are not an adequate explanation for the large quantities of drops and solid materials which sometimes rain from chimney stacks.

An aspect here is the high solid material content of the stack rain. The drops leave large white spots behind on smooth surfaces, for example, on automobile roofs and engine hoods. These spots are clearly gypsum and limestone. The gypsum and limestone content (fine dust) in the flue gas tends to be small. Condensation can only contain a small amount of solid material because it is produced by liquid condensing out of the saturated and super-saturated flue gas. It is unlikely that the condensation drops then attract and absorb large quantities of solid material from the flue gas. There are indeed ultimately only a few solid materials in the flue gas which are not bonded in liquid, and also the solid materials bonded in very fine drops are only small amounts relative to the assumed amounts of condensation. The high solid material content of the stack rain therefore indicates that condensation is not the decisive factor.

Along with poor separation and condensation there must therefore be a third effect which drives liquid (and solid materials) into the stack and causes stack rain. The washing of the drop separator, in particular, the washing of the fine separator, has been recognized as a decisive cause of stack rain.

The connection between washing the drop separator and the emission of fine dust or stack rain was not recognized for a long time. Stack rain and fine dust emissions were recognized and combated as "poor" separation. On many occasions, this was also actually the main cause, and considerable improvements (reductions) were able to be achieved by taking measures. However, stack rain remained a problem even afterwards.

It was now possible to show in tests that the strength of the remaining stack rain depended extensively on the washing cycles of the drop separator, namely, on the washing of the last drop separator in the direction of the flue gas flow. It was possible to establish that shutting down this washing system led to the previously heavy stack rain being reduced to a hardly perceptible level.

This conclusion also agrees with measurements of the carry-through after the drop separators. Both in laboratory measurements and in warranty measurements in power plants, it was established that, during the washing of the last drop separator in the flue gas flow direction, approximately 100 times the quantity of liquid carried through compared with operation without washing.

Finally, it was established that the size of the drops during washing was considerably larger than in normal operation. Particularly large drops were carried over. The washing carry-through consisted of drops which, on the one hand, were large enough to reach the ground after ejection from the stack and, on the other, to be noticed there as large drops.

It had been assumed for a long time that the washing liquid was indeed a liquid which was clean and extensively free from solid materials. Washing therefore appeared to be ruled out as the cause of the stack drops being contaminated with solid material. However, this cleanliness is not the case. The purpose of washing is after all to loosen the deposits (solid material) in the baffle and to remove them from the baffle system. The liquid film which is produced during washing therefore contains a high and, in the case of contamination, even a very high proportion of solid material. Secondary drops which are extracted from this liquid film and transported further with the flue gas can therefore have high solid material contents; theoretically and practically, even more than the solid material content of the suspension solution.

The solid material content clearly depends on the degree of contamination of the baffle. A relatively clean baffle will emit only relatively little solid material when it is washed and a strongly contaminated baffle will emit a large amount of solid material when it is washed. The amount of solid material in the drops ejected during washing is therefore operation and system-dependent.

A series of tests in an industrial power plant has shown the effect of washing on the stack. The drop separator had been replaced in order to be certain of its function. The flue gas desulfurization system was then operated for a day without washing the drop separator. Afterwards, the stack was relatively dry and there was no further stack rain. When the washing of the drop separator was switched on again, stack rain began only approximately 60 seconds after washing had been restarted.

This knowledge has led to modern drop separator systems being built with a third drop separator (very fine separator). The task of this third separator is primarily to separate the carry-through from the washing of the fine separator.

By this means alone, the carry-through of fine dust can be more than halved. This advantage arises as the third drop separator is not washed at all or only rarely washed. Carry-over no longer occurs during washing.

This consideration was also entirely correct. As a result of the infrequent washing, it was possible to significantly reduce the quantity of liquid measured after the drop separator. Where, previously, normal limits for the separation performance of a two-stage separator were 30-50 mg/Nm$^3$, levels of 10-20 mg/Nm$^3$ can now be assumed. It has accordingly been possible to achieve a reduction in the fine dust values by means of the three-stage separator.

Operating problems have, however, also occurred in many of these systems. It was established that the third separator could not operate without regular washing. Over several months, the separator contaminates the operating cycle quite significantly and causes a massive increase in pressure loss.

In some systems, it has even been established that the lamellas in the third separator became progressively contaminated, in spite of daily washing. Washing once a day was clearly not sufficient to remove the contamination which had built up in the course of a day from the lemallas. In individual cases, the contamination of the third drop separator was so severe that elements of the drop separator had been blown out of position by the fan or that the pressure loss had become so great, even after a few months, that the power plant was shut down for manual cleaning. In this case, "only" the third separator was contaminated.

Stack rain was of course observed. Although this stack rain was considerably less than in systems with two drop separators, it was sufficient to be noticed both in operation and by some neighbors. The cause of this stack rain was, on the one hand, the washing which was still necessary and, on the other, an inadequate functioning of the contaminated separator.

The result was therefore unsatisfactory; on the one hand, although the total emissions were reduced (advantageous), on the other, the remaining emissions were emitted in a form which necessarily led to conflicts with inspecting authorities and conservationists, as the emissions (stack rain) could be detected without measuring instruments and were perceptible to the layman. Stack rain settled on automobiles, smooth surfaces and plants, and could be detected immediately, even by the layman, on account of the white gypsum content.

The opposite of what must be in the interests of a power plant therefore occurred. Reducing the emissions was not only intended to satisfy the regulatory and environmental requirements, but to also improve the public image of the power plant. The opposite, however, occurs due to stack rain. Because of the connection with the change to the wet stack, the reduction of emissions leads to contamination which is perceptible and visible to the layman. Conflict is unavoidable.

Operational experience with three-stage separators can therefore be summarized as follows:
1. Emissions reduced
   The emission of fine dust can be significantly reduced by the use of the third drop separator.
2. Contamination of the very fine separator
   The very fine separator becomes contaminated with time, and pressure loss increases. Depending on the method of operation, the system cannot be guaranteed to operate without interruption for the required period of time.
3. Washing the very fine separator
   Washing the very fine separator cannot always safeguard against contamination; it is, however, necessary to allow a longer period of uninterrupted operation for the system.
4. Stack rain
   Stack rain occurs with wet stacks due to the unfortunately unavoidable washing of the very fine separator and the contamination. Conflicts with environmental authorities and conservationists are therefore unavoidable.

Although the concept of the three-stage separator can be seen as an improvement of the previously common separator, the actual objective has not been achieved. The aim of the three-stage separator was to completely eliminate the washing of the third separator. The two first separators were to separate so efficiently that only very small quantities of solid material would find their way to the third separator and would therefore no longer contaminate it. Because of the low level of contamination, it would then no longer be necessary to use the washing system.

This assumption has, however, been proven incorrect in operation. Either the third separator is washed frequently or severe contamination to the point of blockage occurs. Both produce stack rain.

Consideration is in the meantime therefore being given to configuring the drop separator as a four-stage separator. The fourth separator is henceforth to be operated in the mode which was previously intended for the third. The third is washed more frequently, and therefore remains clean and there is no longer a risk of contamination. The fourth separator is intended not to be washed or only washed extremely rarely. This should be possible because so much solid material is additionally removed by the third separator that, as a result, the contamination of the fourth separator proceeds so slowly that washing is only rarely required.

It is to be expected that a fourth separator stage will lead to a further improvement in the situation. The occurrence of solid material in the fourth separator will be less than in the third separator. It must, however, be assumed that contamination will still occur and increased fine dust emissions or stack rain will be caused by washing or contaminated separators.

Some concepts have been disclosed in response to the increased requirements of emission protection and operational safety.

A particularly successful concept is the so-called "tube separator". The tube separator uses tubular segments as baffles in contrast to conventional lamealla separators which use extruded and, in particular, formed profiles.

This tube separator has been shown in operation to be particularly resistant to contamination and to the buildup of deposits and can be used in some plants even without washing systems. In spite of this, the tube separator still provides an acceptable separation performance.

The tube separator has, however, previously only been used as a coarse separator. For use as a fine separator, the lamella separator is superior with regard to separation performance, as the lamella also separates small drops efficiently.

These special characteristics (contamination-resistant even without washing system and efficient for large drops) make the tube separator interesting.

The situation with the inadequate operation of the third "very fine separator" is unsatisfactory with regard to the emissions and to the public image.

Experience shows further problems when consideration is given to the planned $CO_2$ separation systems which in future are to be connected to the $SO_2$ separator. Most of the system concepts currently undergoing trials are based on chemical-thermal processes which work with large contact surfaces. This requires a high degree of purity of flue gas, i.e., the extensive removal of fine dusts and solid material content from the flue gas. The solid materials would otherwise cover the contact surfaces in a relatively short time and at some time lead to blockage of the fixed bed.

SUMMARY

An aspect of the present invention is to provide a separator concept which fulfills the following three conditions:
1. To provide a high long-term separation performance.
   No reduction in the separation performance due to progressive contamination.

2. To avoid carry-over from washing.
　　The carry-over from washing, which in conventional systems was responsible for 60% to 70% of the total liquid carry-over is avoided and the washing performance with regard to fine dust thereby doubled.
3. To not increase pressure loss.
　　Avoiding the increase in pressure loss resulting from a progressive buildup of deposits.

In an embodiment, the present invention provides a separation system for separating drops from a flue gas flow for installation in a gas scrubber of a power plant or an incineration plant which includes a front coarse separator arranged in a gas flow direction, and a rear final separator arranged in the gas flow direction. The rear final separator is provided to have a lower separation performance in comparison with an upstream separator in the gas flow direction and/or is provided as a tube separator. Importance is thereby placed on taking into account the operational requirements (accessibility and feasibility of maintenance).

BRIEF DESCRIPTION OF THE DRAWINGS

The present invention is described in greater detail below on the basis of embodiments and of the drawings in which.

DETAILED DESCRIPTION

In an embodiment of the present invention, the separator system can, for example, comprise three or four separator layers, wherein the first separator layer (coarse separator) in the flue gas direction can be designed as a tube separator or as a lamella separator.

In an embodiment of the present invention, the second separator layer (fine separator) can, for example, be designed as a plate separator in order to utilize the higher performance of a lamella separator (compared with the tube separator).

In four-stage or multi-stage systems, the third (in multi-stage systems, the further, with the exception of the last) separator stage can likewise, for example, be designed as a lamella separator in order to utilize the higher performance of a lamella separator (compared with the tube separator) for small drops.

At the same time, all separator stages (with the exception of the last separator stage) are equipped with washing devices on both sides. This is not necessary in the case of a coarse separator which has been designed as a tube separator.

According to the present invention, the last separator stage is designed as a separator with lower separator performance compared with the preceding separator stage, for example, as a tube separator.

This separator system appears paradoxical according to the prevailing teaching. It was assumed that the separating performance was increased from stage to stage. With every stage, the distance between the separator lemallas was reduced in order to filter ever smaller drops from the flue gas flow (small lamella spacing=small limiting drops).

According to the present invention, it is now proposed using a separator with lower separator performance than the preceding separator, for example, a tube separator, as very fine separator or last separating stage. Tube separators are poor separators compared with lamella separators for small drops. Its use as the last separator stage therefore contradicts the prevailing teaching, according to which the last separator must produce the best separating performance.

The present invention has recognized that the prevailing teaching, according to which the separating performance must be increased from stage to stage, leads to a dead end. The previous teaching has not recognized that, from a certain separating performance, with gases which are charged with solid materials, the unavoidable washing causes greater emissions than the increase in the separating performance reduces the emissions.

In other words, as an increase in separating performance in the last stage leads to very low distances between the separator lamellas, these separators are very prone to contamination and must be washed frequently. Massive carry-over occurs as a result of the blockage and then washing, which causes more emissions than the separator stage with the increased cleaning performance filters out of the flue gas.

The solution according to the present invention therefore takes the opposite path. It has been recognized that, from a certain separating performance of the overall system, washing causes the greater part of the emissions and contamination the other part. Particularly in the case of the wet stack, this not only leads to high emissions but also to unpleasant consequences (visible emissions as stack rain).

A first object on which the separator system according to the present invention is based is therefore to find a solution with which the last separator stage does not have to be washed. As a solution, this object can be achieved by a separator with a poorer separation performance.

A second object is to find a solution which, in spite of no washing, does not become so contaminated that the pressure loss builds up significantly and, further, the contaminated lamella produces emissions.

The tube separator is known to either remain completely clean or to be only slightly contaminated, even after lengthy operation without washing. This contamination of the tubes has virtually no effect on the separation performance. It has surprisingly been shown that, in spite of its low separation performance compared with lamella separators, it is well suited as the last separation stage before the stack or reheating process. A possible explanation for this is the following:

The main function of the last separator is to trap and separate the carried-over washing drops from the preceding separator. These washing drops tend to be large to very large drops. The tube separator separates well, particularly with large drops. Its weakness is small drops. As the last separator, the tube separator is therefore entirely suitable and effective for this purpose.

It has surprisingly been shown that the disadvantage that the small drops, which have made it through the upstream separation stages, without being separated is not important. This is because these small drops clearly form only a relatively small part of the quantity of liquid which reaches this tube separator; the volume is relatively small. Depending on the washing frequency, 90% to 99% of the quantity of liquid is carry-over from the washing process of the upstream separation stage.

The separation system according to the present invention can be built with two, three, four or more separation stages. In an embodiment of the present invention, the separation system can, for example, have three or four separation stages; however, only two or more than four stages are conceivable.

The separation system can be built for vertical as well as for horizontal gas flow, and also for a gas flow which changes direction or is angled between the separation stages. Systems exist which have a coarse separator built into the vertical gas flow (internal separator) and the fine separator built into the horizontal gas flow (external separator in separate housing).

All types of known separators can be used, for example, tube separators (horizontal or vertical incident flow), lamella separators (horizontal incident flow), roof-shaped or flat lamella separators (vertical incident flow), roof-shaped or flat tube separators (vertical incident flow) or other designs of baffle.

Some of the possible combinations of these different designs are shown by way of example in the following drawings.

Figure 1:
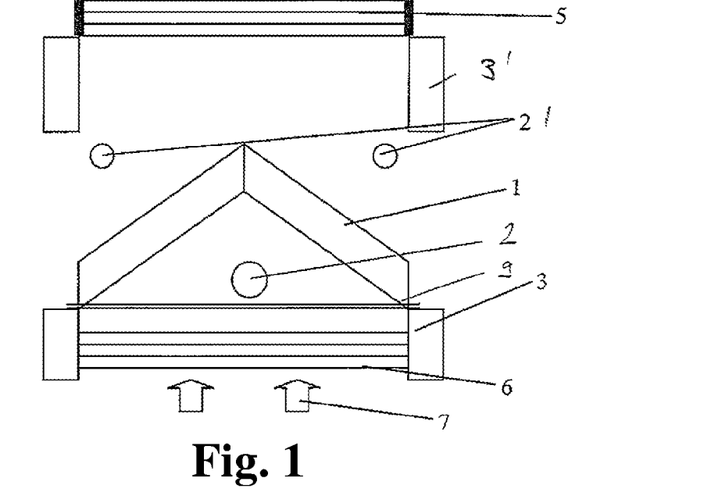
FIG. 1 shows a three-stage separation system in the vertical gas flow.

The three-stage separation system shown in FIG. 1 is intended for use in a vertical gas flow, directed from bottom to top, and symbolized by the arrows 7 in FIG. 1. Viewed in the direction of the gas flow, it comprises a coarse separator 6 in the form of a tube separator which is mounted on a supporting structure 3. This coarse separator 6 is used particularly for separating large water drops.

A fine separator 1 in the form of a lamella separator is arranged above the coarse separator 6, after the coarse separator 6 in the direction of the gas flow. It is supported on the same supporting structure 3 as the coarse separator 6.

A washing device 2, by means of which the fine separator 1 can be sprayed from below with washing liquid (usually water) is provided between the coarse separator 6 and the fine separator 1. The washing device 2 is fixed to a crossbeam 9. Two further washing devices 2', which are used to spray the fine separator 1 from above, are arranged above the fine separator 1.

A final separator 5 in the form of a tube separator, which has a lower separation performance compared with the fine separator 1, is provided mounted on a further supporting structure 3' above the washing device 2'.

In the description of the following, further exemplary embodiments of the separation system according to the present invention, parts and components whose function has already been described with reference to FIG. 1, are assigned the same references.

The four-stage separation system shown in FIG. 2 is again located in a vertical gas flow 7 directed from bottom to top. It comprises a flat separator 8, which can be sprayed with washing liquid with the help of washing devices 2, 2' located before and after it in the gas flow direction.

Figure 2:
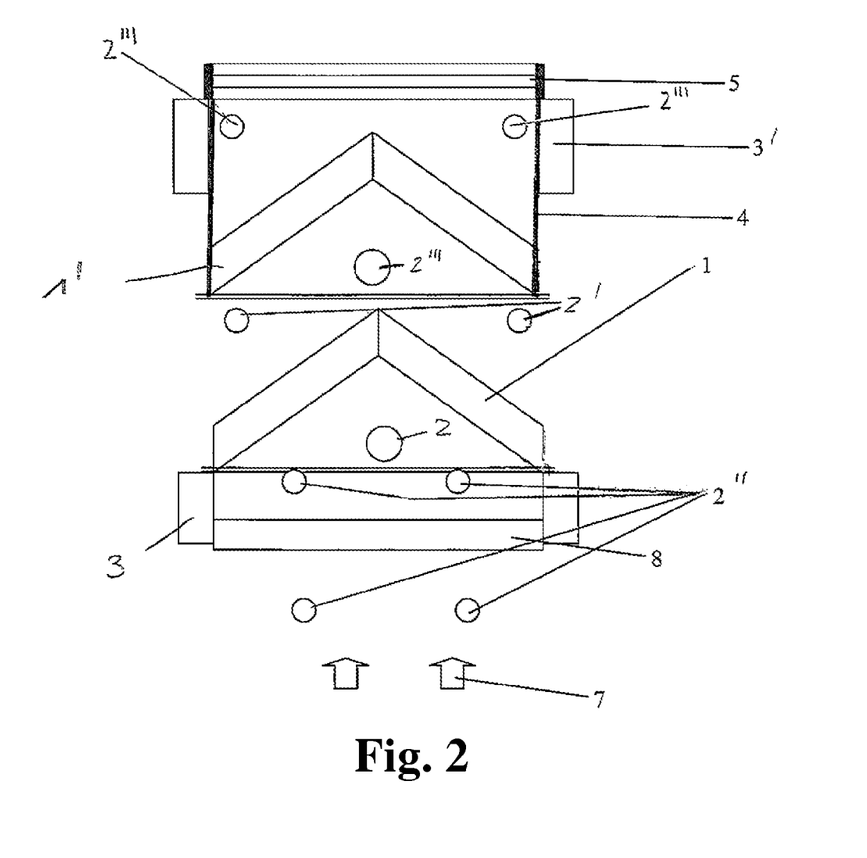
FIG. 2 shows a four-stage separation system in the vertical gas flow.

The flat separator 8 is again fixed to an intermediate structure 3, as is a first fine separator 1 in the form of a lamella separator which is arranged above it. Washing devices 2, 2' for spraying with washing liquid are again provided in an arrangement which corresponds to that of the exemplary embodiment shown in FIG. 1.

A second fine separator 1', which is likewise in the form of a lamella separator, is arranged after, i.e., above, the first fine separator 1 in the gas flow direction. Like the washing devices 2''' which are provided for the cleaning thereof, it is also fitted to a further intermediate structure 3'.

A final separator 5 in the form of a tube separator is again provided above this fine separator 1'.

In the two exemplary embodiments described above, the separation system according to the present invention is located in a vertical gas flow. In the exemplary embodiments shown in FIGS. 3 and 4, however, the gas flow is deflected horizontally with the help of an appropriately designed housing 10.

Figure 3:
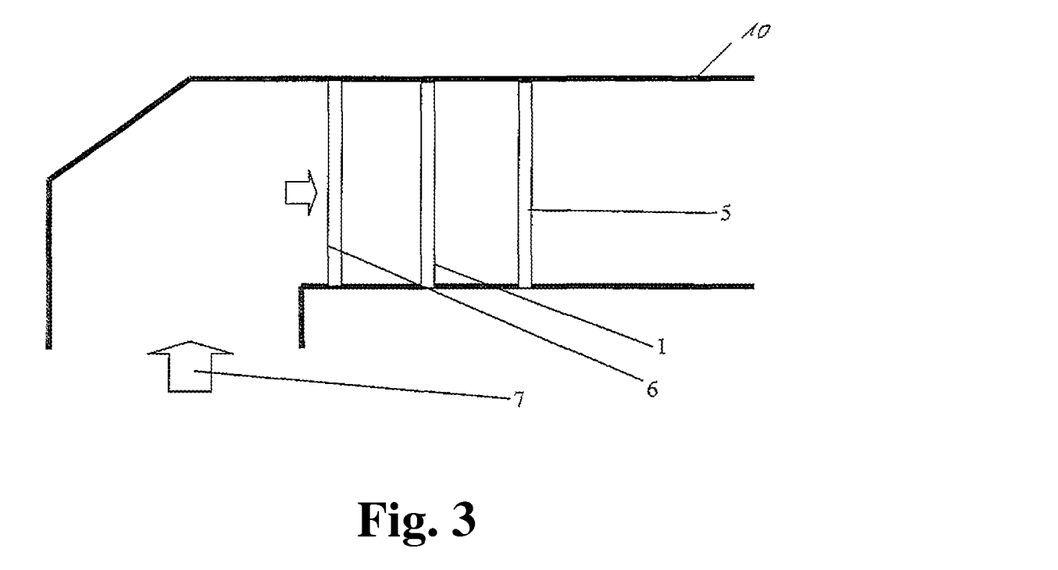
FIG. 3 shows a three-stage separation system in the horizontal gas flow, wherein the individual separators are not shown in detail.

In the exemplary embodiment shown in FIG. 3, the coarse separator 6, the fine separator 1 and the final separator 5 are located in a housing region in which a substantially horizontal gas flow prevails. As in the two exemplary embodiments described above, the coarse separator 6 can, for example, be in the form of a flat or tube separator, the fine separator can, for example, be in the form of a lamella separator, and the final separator 5 can again, for example, be in the form of a tube separator.

Figure 4:
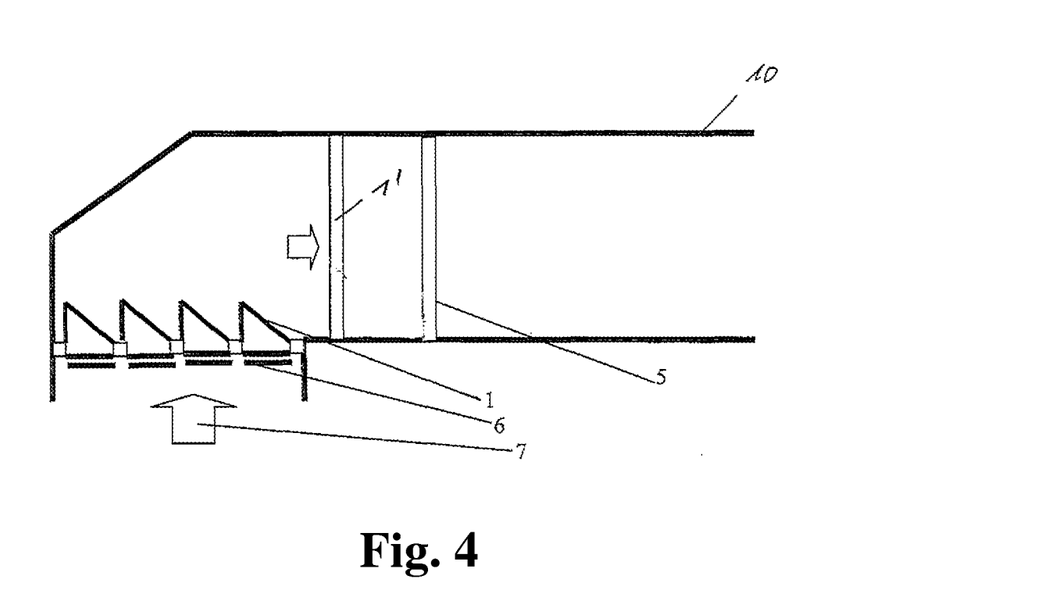
FIG. 4 shows a separation system with a combination of separators with vertical and horizontal incident flow.

The exemplary embodiment shown in FIG. 4 is a further variant of the separation system according to the present invention. In this system, both the coarse separator 6 and a first fine separator 1 are arranged in a region of the housing 10 in which the substantially vertical gas flow prevails.

A further fine separator 1' and a final separator 5 which follow in the gas flow direction are arranged in a region of the housing 10 in which a horizontal gas flow prevails.

Figure 5:
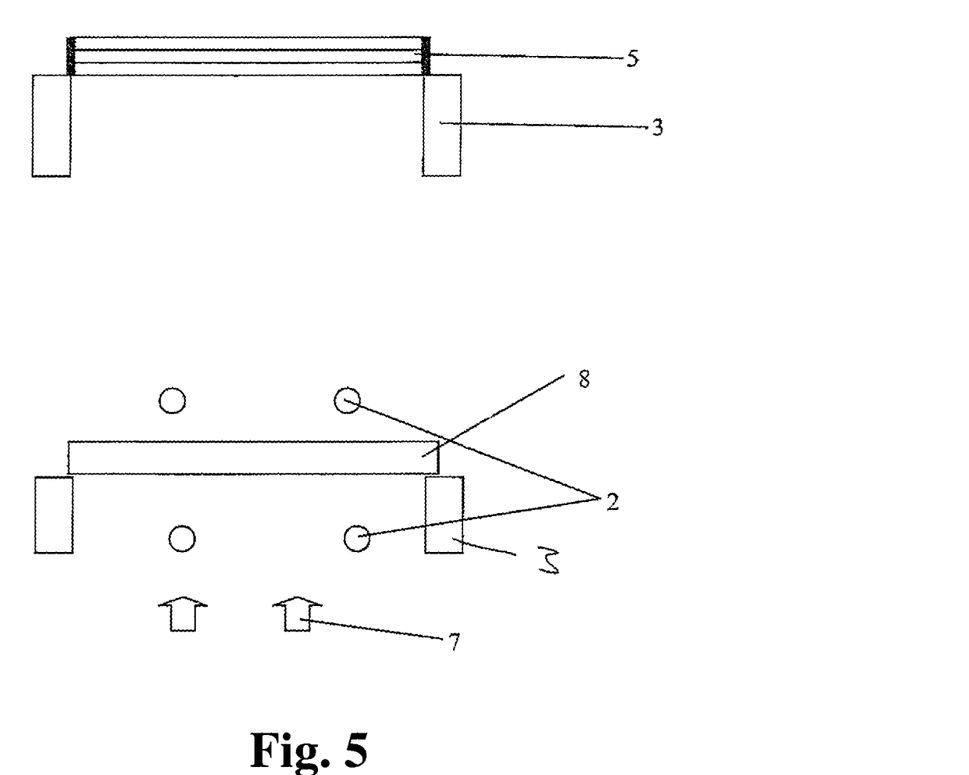
FIG. 5 shows a two-stage separation system in the vertical gas flow.

The exemplary embodiment shown in FIG. 5 shows a separation system according to the present invention with just two stages in the vertical gas flow 7. It comprises a coarse separator 8 in the form of a flat separator mounted on a first supporting structure 3. For the cleaning thereof, washing devices 2 are arranged before and after it with respect to the gas flow direction. The final separator 5, which is again in the form of a tube separator, is arranged on a second supporting structure 3' which is provided above the coarse separator 8. Because of the absence of the fine separator in the exemplary embodiment according to FIG. 5, this exemplary embodiment has a lower overall separating performance than those described above.

The present invention is not limited to embodiments described herein; reference should be had to the appended claims.

What is claimed is:

1. A separation system for separating drops from a flue gas flow for installation in a gas scrubber of a power plant or an incineration plant, the separation system comprising, in a gas flow direction:
    a first coarse separator; and
    a last separator,
    wherein,
    the last separator is at least one of configured to filter larger drops compared to the first separator and provided as a tube separator.

2. The separation system as recited in claim 1, wherein the first separator is provided as a tube separator or as a lamella separator (chevron-type separator).

3. The separation system as recited in claim 2, wherein the lamella separator (chevron-type separator) comprises lamella packets which are at least one of flat, roof-shaped, V-shaped, angled, and vertical with respect to the gas flow direction.

4. The separation system as recited in claim 3, further comprising at least one washing device configured to clean the lamella separator (chevron-type separator) during an operation of the separation system.

5. The separation system as recited in claim 2, wherein the last separator is provided so that no cleaning is required during an operation of the separation system.

6. The separation system as recited in claim 5, wherein the last separator is a tube separator comprising tubes arranged in at least two successive tube levels in the gas flow direction.

7. The separation system as recited in claim 6, wherein the tubes of the at least two successive tube levels are arranged so as to be offset perpendicular to the gas flow direction.

8. The separation system as recited in claim 7, wherein the tubes of the at least two successive tube levels are arranged so as to overlap one another when viewed in the gas flow direction.

9. The separation system as recited in claim 1, further comprising at least one fine separator arranged between the first separator and the last separator in the gas flow direction.

10. The separation system as recited in claim 9, wherein the at least one fine separator is provided as a lamella separator (chevron-type separator).

11. The separation system as recited in claim 9, wherein the lamella separator (chevron-type separator) comprises lamella packets which are at least one of flat, roof-shaped, V-shaped, angled, and vertical with respect to the gas flow direction.

12. The separation system as recited in claim 1, further comprising at least one washing device configured to clean the first separator during an operation of the separation system.

13. The separation system as recited in claim 1, further comprising,
- at least one fine separator arranged between the first separator and the last separator, and
- at least one washing device,
- wherein, the at least one washing device is configured to clean the first separator and the at least one fine separator during an operation of the separation system.

* * * * *